Feb. 2, 1932. E. G. ROMEISER 1,843,835
ELECTRIC WIRE CONDUIT
Filed March 2, 1931
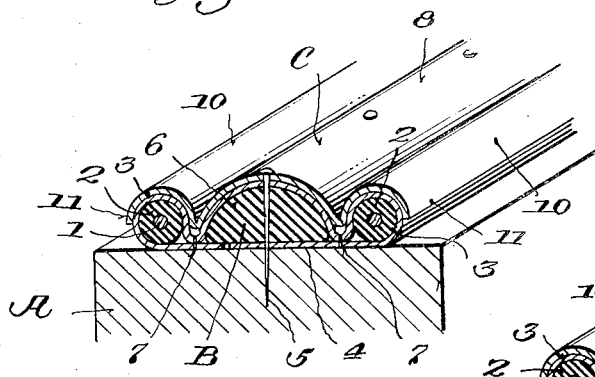
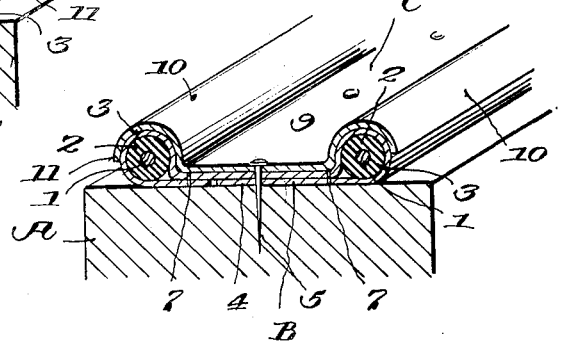
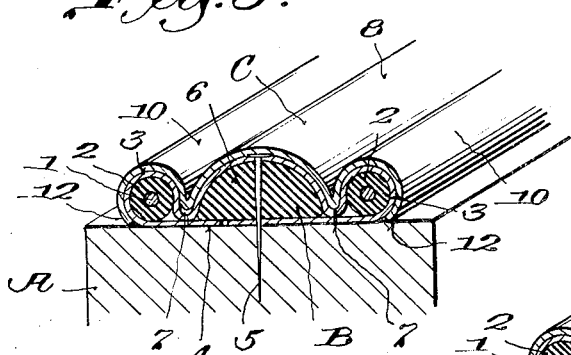
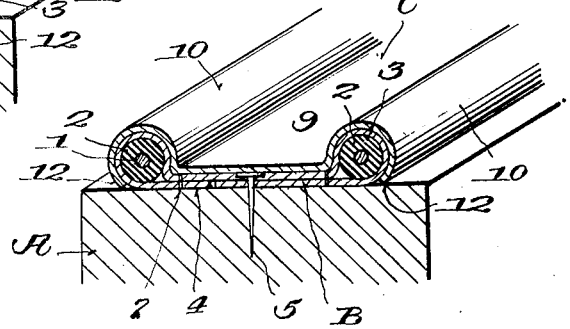
Inventor
Ernest G. Romeiser
By Depe & Kirchner
Attorneys Patented Feb. 2, 1932

1,843,835

UNITED STATES PATENT OFFICE

ERNEST G. ROMEISER, OF UNION CITY, INDIANA

ELECTRIC WIRE CONDUIT

Application filed March 2, 1931. Serial No. 519,663.

My invention relates to electric wire conduits, and particularly to insulated electric current conductors adapted to be used in interior installations.

A particular type of conduit to which my present invention is especially adapted comprises an electric conducting wire or a plurality of such wires, each provided with an insulating covering and an area adapted to receive tacks or similar fastening means for securing the conduit to a support. The wire coverings are generally formed of paper, textile fabric or similar material with jackets of rubber or its compounds immediately surrounding the wires themselves. The supports to which these conduits are frequently secured are commonly the interior walls, floors and ceilings of rooms and the like in dwelling houses and other buildings, and when a run of the conduit is installed in the lower zone of an interior, as for example along the baseboard, wainscoting, or lower part of the wall of a room, the conduit becomes subject to injury from accidental blows by the feet of persons, the legs of chairs and other articles of furniture, vacuum cleaners and other floor cleaning instrumentalities, and from a variety of other causes.

It will be appreciated that the appearance of a conduit used in interior installations is important, and that injuries thereto are objectionable insofar as the resulting defacement of the covering material detracts from the neat and attractive appearance originally presented by the conduit. It is an object of the present invention to provide a conduit of the type indicated with means for preventing such injuries.

In addition to the impaired appearance of the conduit, the causes suggested hereinabove frequently operate to bring about functional defects in the conduit by removing a portion of the wire insulation and exposing the wires. Serious damage has been caused by short circuits resulting from wires so exposed. A further primary object of the present invention is to provide a conduit having means to prevent such injuries.

To accomplish the foregoing and other objects and advantages which will become more evident as the description proceeds, my invention contemplates associating with the conduit a covering shell or sheath, preferably metallic, to protect the current carrying wires and their insulating jackets. In certain preferred forms of embodiment, which will be explained in detail hereinafter, an especial feature of the invention consists in providing the protective sheath with means for causing the same to adhere to the wire carrying body, which has previously been tacked or otherwise secured in operative position upon the support. In these preferred embodiments, the body is adapted to be attached to the support structure, whereupon the protective sheath may be sprung in place over the body to protect the same from injury and to conceal the fastening tack heads.

In the accompanying drawings which form part of this application for Letters Patent and in which the same reference character designates the same part or feature in the several views.

All of the figures are perspective views with one end in section, of a supporting member and various types of associated electric wire-containing bodies and protective sheaths therefor, as contemplated by the invention.

Referring now to the drawings, the reference character A in each of the figures designates any suitable support, such as a portion of a wall, floor, baseboard or the like. In each of the figures, the reference character B indicates a wire-containing body, and C a protective shell or sheath adapted to be associated with the body.

The body B may be constructed in various different forms, but each type of body will necessarily contain one or more electric conductor wires 1, each surrounded by an insulating jacket 2 of rubber, rubber composition or equivalent non-conducting material.

I prefer to provide the wires 1 in pairs, and to surround each wire with an insulating jacket 2 of tubular or cylindrical form. The pair of wires and their insulating jackets are conveniently enclosed within the folds of a strip of flexible fabric, such as paper, leather, textile material or the like. It will be observed by reference to the drawings that the fabric and the jacketed wires are associated in such a way that the latter form edge enlargements or beads 3 longitudinally along the body formed by the assembly of folded fabric and jacketed wires. An intermediate area 4 is provided between the wire-containing edge beads, which serve to space the wires safely apart, and also to provide a tack receiving area through which a nail, tack or equivalent fastening element 5 may be passed into the support A for the purpose of securing the entire wire-containing body to the support.

The tack receiving area 4 may be provided with a relatively large filler 6 to produce an exaggerated central bead, (as shown in Figs. 1 and 3), or the area 4 may consist merely of two plies of the covering fabric, (as shown in Figs. 2 and 4). In each case I find it convenient to fix the wire-containing jackets in the covering fabric by means of lines of stitching 7 at the juncture of the beads 3 and the intermediate tack receiving area 4.

For the protection of the body which has just been described I provide the covering shell or sheath C, which, in variously modified forms, is shown in the several figures. In each case the sheath C includes a central area adapted to be received over the tack receiving area 4 of the body and therefore conforming to the contour of the area 4. Thus the central area of the sheath is shown particylindrical at 8 in Figs. 1 and 3 and plane or flat at 9 in Figs. 2 and 4.

The longitudinal margins 10 of the sheath C are adapted to overlie and protect the upper portions of the wire-containing beads 3 of the body. For this purpose I conveniently provide the margins 10 with a contour conforming closely to that of the body beads 3. These body beads are preferably of cylindrical or tubular shape.

According to the principles of the present invention, the sheath margins adapted to overlie and protect the wire-containing beads of the body may be provided in either of two forms. One form is illustrated in Figs. 1 and 2, and consists of a marginal portion 10 having an outer edge 11 which is spaced from the line where the margin 10 joins the center portion 8 or 9 of the sheath by a distance which is approximately equal to the diameter of the wire-containing bead 3. In other words, the margin 10 is substantially semicircular in cross section, so that the sheath C of Figs. 1 and 2 may be capped snugly over the body B without requiring the material of the sheath to be deformed. The association of such a sheath with its cooperating body is accomplished by passing tacks or nails 5 through both the sheath and the body and thence into the support A.

The sheath margins 10 shown in Figs. 3 and 4 are provided with outer free edges 12 which are spaced from the line in the sheath material at the juncture of the margin and the center portion 8 or 9 by a distance which is less than a diameter of the bead 3. Thus the sheath margins of Figs. 3 and 4 are less than circular and more than semicircular in cross section, or in other words these margins are more than half-cylindrical and less than full-cylindrical in contour. It will be evident that this form of sheath margin is adapted to be received over its cooperating body bead by undergoing certain expansion. This expansion is permitted by the inherent resilience of the metal, so that the entire sheath of Figs. 3 and 4 is associated with the wire-containing body by springing the sheath margins over the edge beads of the body. The body may previously have been tacked in place to the supporting member, so that springing the sheath margins over the body beads results not merely in securing the sheath to the body, and hence to the support, but also in covering and concealing the heads of the fastening nails or tacks.

It will be evident that the several embodiments of the invention which have been described, as well as others which will readily suggest themselves to persons skilled in the art, accomplish the objects and purposes set forth hereinabove by providing a conduit containing wires and insulating jackets therefor with an efficient sheath to protect the wires and their coverings from mutilation, defacement, and the danger of possible short circuiting.

While I have shown and described the present invention embodied in straightaway lengths of body and sheath, it will be understood that the several elements may be provided in portions of preformed curvature to accommodate areas in an installation where the conduit must be disposed about corners, and to meet analogous conditions. It is also to be understood that the invention may be embodied in other and different forms not shown or described in this application, but all such modifications, to the extent that they embody the principles of the invention as pointed out in the appended claims, are to be deemed within the scope and purview thereof.

Having thus described my present invention what I claim and desire to secure by Letters Patent is:

1. An electric wire conduit including a body having opposite longitudinal edge beads, electric conducting wires contained in said beads, and an area of the body between said beads adapted to engage and contact with a flat support and receive tacks for securing the body thereto, in combination with a metallic covering sheath having a central area adapted to be received over the tack-receiving area of the body and margins adapted to be received over the wire-containing beads.

2. An electric wire conduit including a body having opposite longitudinal edge beads of substantially cylindrical form, electric conducting wires contained in each of said beads, and an area between said beads adapted to engage and contact with a flat support and receive tacks for securing the body thereto, in combination with a metallic covering sheath having a central area adapted to be received over the tack-receiving area of the body and having parti-cylindrical margins adapted to fit snugly down over the wire-containing beads.

3. The combination claimed in claim 2, in which the parti-cylindrical margins of the metallic sheath are not more than semi-circular in cross section, whereby the metallic sheath may be fitted snugly over the body without requiring the sheath to be deformed.

4. An electric wire conduit including a body having opposite longitudinal edge beads of substantially cylindrical form, electric conducting wires contained in each of said beads, and an area between said beads adapted to receive tacks for securing the body to a support, in combination with a metallic covering sheath having a central area adapted to be received over the tack-receiving area of the body and having margins more than half-cylindrical and less than full-cylindrical in contour adapted to fit snugly down over the wire-containing beads, the extreme edges of the sheath margins underlying a portion of the beads to retain the sheath and body together.

5. An electric wire conduit including a body having opposite longitudinal edge beads of substantially cylindrical form, electric conducting wires contained in each of said beads, and an area of the body between the beads formed of flexible fabric and adapted to receive tacks for securing the body to a support, in combination with a metallic covering sheath having a central area adapted to be received over the tack-receiving area of the body and having margins more than half-cylindrical and less than full-cylindrical in contour adapted to fit snugly down over the wire-containing beads, the extreme edges of the sheath margins underlying a portion of the beads to retain the sheath and body together.

6. An electric wire conduit including a body having opposite longitudinal edge beads, electric conducting wires contained in said beads, and an area of the body between said beads adapted to engage and contact with a flat support, in combination with a metallic covering sheath having a central area adapted to be received over the tack-receiving area of the body and margins adapted to be received over the wire-containing beads, the central areas of the sheath and the body being adapted to receive tacks for holding the sheath securely down on the body and the central area of the body securely engaged with the support.

In testimony whereof I affix my signature.
ERNEST G. ROMEISER.